Nov. 24, 1959 N. R. SMITH ET AL 2,914,600
EMBEDDED COIL AND METHOD OF MANUFACTURING
Filed Sept. 5, 1952 2 Sheets-Sheet 1

INVENTORS.
NATHAN R. SMITH
NORMAN J. ROSEN
BY THEIR ATTORNEYS.
HARRIS, KIECH, FOSTER & HARRIS

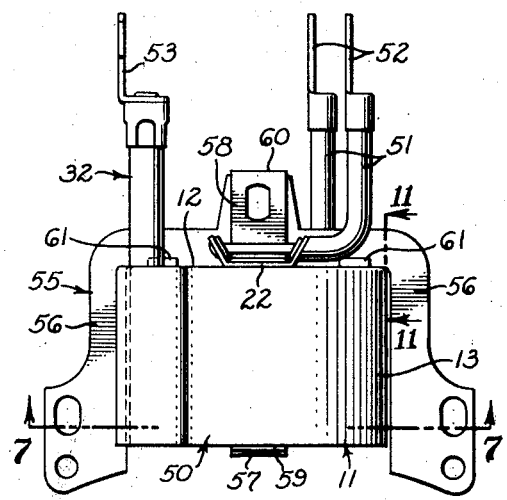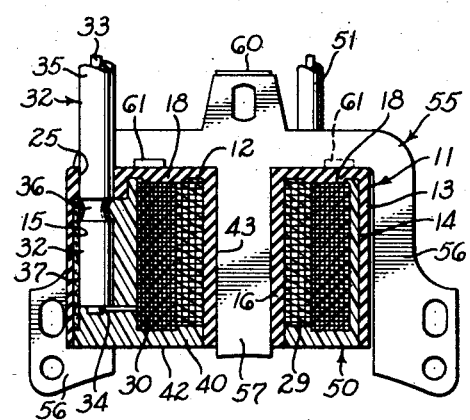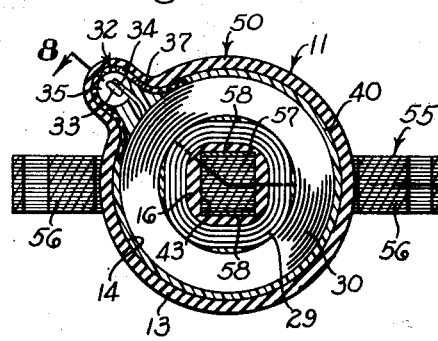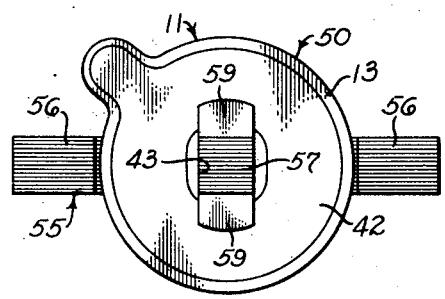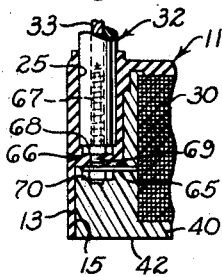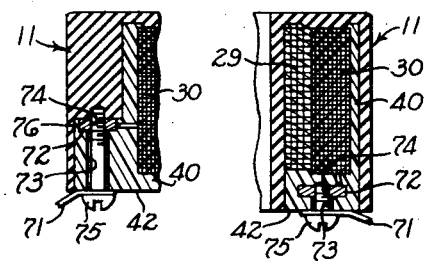
INVENTORS.
NATHAN R. SMITH
NORMAN J. ROSEN
BY THEIR ATTORNEYS.
HARRIS, KIECH, FOSTER & HARRIS

# United States Patent Office 2,914,600
Patented Nov. 24, 1959

2,914,600

EMBEDDED COIL AND METHOD OF MANUFACTURING

Nathan R. Smith, Pasadena, and Norman J. Rosen, Altadena, Calif., assignors, by mesne assignments, to Chicago Telephone of California, Inc., South Pasadena, Calif., a corporation of California Application September 5, 1952, Serial No. 308,072

7 Claims. (Cl. 174—52)

The present invention relates in general to a method of completely isolating electrical devices from their environment, and to the resulting product. More particularly, the invention relates to a method of encasing electrical devices in a material which insulates and waterproofs them and transforms them into a structurally integral unit, and relates to the resulting electrical devices themselves.

The method of the invention is of particular utility when employed to encase such electrical devices as coils and will be considered in such connection hereinafter for purposes of illustration. The term "coil" is used generically herein to designate any electrical device having one or more windings and includes such devices as transformers, electromagnets, relays, or the like. For convenience, the invention will be considered principally as applied to high-voltage coils for use in the ignition systems of internal combustion engines, such as the motors used on power lawn mowers, power saws, and the like. However, it will be understood that such an application of the invention is illustrative only and that various other possible applications thereof exist.

As is well known, the coils employed in the ignition systems of internal combustion engines are frequently shorted out when such engines are operated under adverse weather conditions. For example, this is a common occurrence when lawn mowers are employed to cut wet grass, or when chain saws are used in wet weather, or in snow. Coils or other electrical devices shorted by moisture are also encountered frequently in other types of equipment operated under similar adverse conditions. The present invention avoids such difficulties by providing a coil or other high-voltage electrical device which is completely waterproofed so that it will operate satisfactorily even in a moist or wet environment, which is an important feature.

In general, the invention provides a method of manufacturing an electrical device, such as a coil, which includes: manufacturing a case, preferably of plastic material, having a closed lower end and an open upper end; placing one or more windings, or other electrical elements, in the case; inserting electrical conductors into the case, either through apertures in the case or through the open upper end thereof; connecting the conductors to the electrical elements; filling the case with a settable plastic material to a depth sufficient to cover the windings or other electrical elements, the connections between the conductors and such electrical elements; eliminating all air from the resulting assembly, either by subjecting the assembly to a vacuum, centrifuging it, or the like; and, finally, setting the plastic material with which the case has been filled, such plastic material preferably being thermosetting since the resulting product normally operates at elevated temperatures. However, the case may be filled with a thermoplastic material for some applications of the invention.

In accordance with the present invention, the case in which the windings or other electrical elements are installed serves as a permanent housing for the finished product and also serves as a mold for the plastic material in which the electrical elements and connections are encased, the case also providing a platform or support for terminals for external connections, etc. The plastic materials with which the case is filled integrates into a single unit the case, the windings, or other electrical elements in the case, the electrical connections and the material of the case itself, this being especially true when a plastic material is employed for the case so that the plastic filling and the case bond together to some extent at least. If an epoxy resin is used to fill the case and if the latter is formed of Bakelite, as is preferable, an extremely strong bond between the plastic filling and the case results. In fact, there is a mutual strengthening effect between the Bakelite case and the epoxy resin filling which produces as assembly having a much greater resistance to mechanical shock and to abrasion than does either material separately, which is an important feature.

Also, if the windings and conductors are coated with suitable insulating material, this material may be selected to bond to the plastic filling to further integrate the structure. However, even if such insulating materials are not used, the plastic filling penetrates every minute space throughout the windings and surrounds the connections and the conductors thereto so that an integral structure is obtained by mechanical interlock, which is an important feature. Additionally, such penetration by the plastic filling thoroughly insulates the various elements within the case so as to prevent current leakage and to prevent invasion by moisture and the resulting voltage breakdown and corrosion which are important features.

By utilizing a case for the electrical device as a mold for the plastic material employed to encase the various electrical elements and connections, the present invention avoids all of the disadvantages of employing a separate mold from which the molded structure must be removed after the plastic material has set, which is an important feature. More particularly, the present invention avoids such disadvantages inherent in the use of separate molds as, for example, leakage at the joints of separate molds, the necessity for dipping such separate molds in wax or otherwise treating them to prevent leakage, the necessity for greasing or otherwise treating such separate molds to insure ready removal of the molded structure therefrom, and the like. Furthermore, because of the fact that the plastic material must be left in any separate mold for a considerable period of time while setting occurs, large-scale manufacture requires the use of extremely large numbers of separate molds, which is obviously undesirable. Also, mold maintenance and replacement are a serious problem. In accordance with the present invention, on the other hand, one, or at most a few, machines can produce all of the cases necessary for incorporation in the product even with large-scale production, thereby eliminating any necessity for the acquisition and maintenance of large numbers of separate molds, which is an important feature of the present invention.

An important object of the invention is to machine off the upper end of the case and a portion of the plastic material with which it is filled after the plastic material has set, the upper end of the case and the upper portion of the plastic filling being machined off to a level below the surface of the plastic material but above the electrical elements and connections encased in the plastic filling. Thus, the plastic material with which the case is filled forms one face of the finished product. Preferably, a plastic material is employed for the filling which is transparent, or at least semitransparent, so that the windings, or other electrical elements, and the connections thereto can be inspected in situ under de-energized conditions or under energized conditions when undergoing test, which is an important feature. However, it is not essential that transparent materials be used.

It must be pointed out that the term "machining" is used generically herein to describe removal of the upper end of the case and the upper portion of the plastic filling in any suitable manner, as by cutting, grinding, or the like. Consequently, the term "machining" is to be regarded herein in this broader sense.

Another object of the invention is to provide a case having a central, hollow core which is carried by the lower end of the case and which core is open at its lower end and closed at its upper end. The winding or windings of a coil are positioned in the space around this hollow core, and the closed upper end of the core, which is integral with the remainder of the core, prevents the plastic filling from entering the hollow core when it is poured into the case. The closed upper end of the hollow core is located at a level above the level to which the case and the plastic filling are machined off so that the closed upper end of the hollow core is also machined off, thereby providing a central opening through the finished product, which is an important feature of the invention since it eliminates any necessity for the use of removable plugs, or the like, to keep the plastic filling from entering the hollow core. The resulting central opening may receive a magnetizable core, armature, or the like, in the finished product.

Another object is to provide a device wherein the conductors electrically connected to the electrical elements in the case extend through apertures in the bottom or sides of the case, and wherein means are provided for sealing such apertures so that leakage of the plastic filling cannot occur. In this connection, an object is to provide a seal by soldering, or otherwise securing, the conductors leading to the electrical elements within the case to terminals located externally of the case, the solder, or other connecting material, serving to close any apertures in the case adjacent the terminals and thereby seal the case against leakage of the plastic material.

Another object is to employ, as one electrical conductor, an insulated cable which is inserted into the case through an aperture therein and which fits tightly in the aperture to seal it against leakage of the plastic material when it is placed in the case. Such conductor may, for example, be a high tension cable connected to the secondary winding of the device. In this connection, a further object of the invention is to extend the insulation of the electrical conductor within a groove which is formed within the case, whereby the plastic filling enters the annular groove so as to securely lock the conductor in place after setting.

Another object is to provide an electrical device wherein one of the conductors is located adjacent and parallel to a wall of the case and wherein a sheet of fibrous material, such as heavy blotting paper, for example, is inserted between the conductor and the adjacent wall of the case for insulation purposes and to space the conductor from the case. The plastic material with which the container is filled impregnates the fibrous material so as to protect the conductor and to insulate it additionally, which are important features of the invention.

Another object of the invention is to provide a case having one or more pairs of spaced ribs which receive therebetween portions of a magnetizable core, armature, or the like, the ribs of each pair converging inwardly so that the core or armature is wedged therebetween to restrain the case relative to the core or armature structure, or vice versa, under the influence of vibrational or other forces.

Another object is to provide a device wherein the plastic filling which encases the elements within the case is clear and has embedded therein a descriptive label visible from the machined surface of the device, the label preferably being formed of an insulating material, blotting paper being an example.

A further object is to provide a device which may employ coils of varying thicknesses with the same case, it merely being necessary to machine the case down further when thin coils are utilized so as to obtain a thinner final product.

An important object of the invention is to provide a way of making external electrical connections to the coils which involves embedding a metallic terminal, such as a block, within the plastic filling and subsequently, after the plastic filling has set, drilling a hole through the plastic filling into the metallic terminal, the hole within the terminal subsequently being tapped to receive a screw, or the like. In accordance with one embodiment of the invention, the metallic terminal is completely surrounded by the plastic filling and, in another, the metallic terminal is seated against a shoulder, or the like, on the case and is in contact with the plastic filling over the remainder of its surface area. With this construction, the necessary connection to the embedded terminal may be made readily after setting of the plastic filling and after machining off of the excess, the concept of drilling into and tapping the metallic terminal after the device is otherwise completed being particularly important since it eliminates any necessity for maintaining a particular orientation for a previously tapped hole in the terminal.

The foregoing objects and advantages of the present invention, together with numerous other objects and advantages thereof which will become apparent, may be attained with the exemplary embodiments of the method and product of the invention which are illustrated in the accompanying drawings and described in detail hereinafter. Referring to the drawings:

Fig. 6 is an elevational view showing the structure of Fig. 5 assembled with a core structure;

Fig. 7 is a sectional view taken along the arrowed line 7—7 of Fig. 6;

Fig. 8 is a sectional view taken along the arrowed line 8—8 of Fig. 7;

Fig. 9 is a bottom plan view of the structure illustrated in Fig. 6;

Fig. 10 is a fragmentary sectional view showing an alternative connection between a conductor and an electrical element within the case;

Fig. 11 is a fragmentary sectional view taken as indicated by the arrowed line 11—11 of Fig. 6;

Fig. 12 is a fragmentary sectional view somewhat similar to Fig. 10, but illustrating an alternative coil connection;

Fig. 13 is a fragmentary sectional view similar to Fig. 12, but illustrating still another coil connection;

Figure 1:
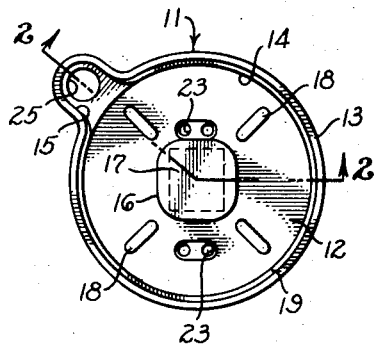
Fig. 1 is a plan view of a case for use in the method and product of the invention.

The drawings illustrate the method and product of the invention as applied to or embodied in a magneto or ignition coil which may be employed in the ignition system of an internal combustion engine, particularly where the engine is required to operate under conditions such that moisture is a problem. However, it will be understood that the applications or embodiments of the invention suggested in the drawings are illustrative only and that various other applications or embodiments thereof are possible as hereinbefore explained in more detail.

Figure 2:
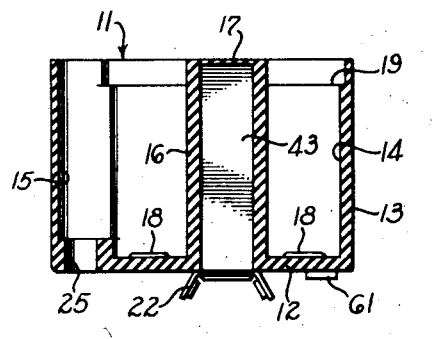
Fig. 2 is a sectional view taken along the arrowed line 2—2 of Fig. 1.

Referring particularly to Figs. 1 and 2 of the drawings, the numeral 11 designates a case which is preferably formed of a suitable plastic material, such as Bakelite, for example. The case 11 can be manufactured in quantity at low cost by automatic molding equipment. As will be discussed in more detail hereinafter, the case 11 serves both as a housing and as a mold, thereby avoiding the necessity for the use of large numbers of expensive molds and the additional operations and the difficulties encountered therewith, which is an important feature.

Considering the case 11 in more detail, it is closed at its lower end by a bottom wall 12 and includes an irregular side wall or peripheral wall 13. The case provides a cavity 14 and a recess 15 at one side of the cavity which communicates laterally with the cavity, the cavity 14 and the recess 15 both being open at their upper ends. Centrally located within the cavity 14 is a hollow core 16 which is open at its lower end and which is closed at its upper end by a top wall 17, the core 16 being carried by the bottom wall 12 of the case 11 and being integral therewith. The hollow core 16 is preferably square or rectangular in internal cross section to receive a similarly shaped core structure, or a similarly shaped leg of a core structure, as will be discussed in more detail hereinafter. Externally, the core 16 is preferably rounded somewhat so that it may be encompassed by a winding, as will be discussed later. The bottom wall 12 of the case 11 is provided with upstanding projections, such as ribs 18, which serve to space the one or more windings upwardly from the bottom wall 12 so that a plastic material with which the case is filled may flow under the windings, all as will be discussed hereinafter.

The upper end of the side wall 13 is desirably provided with a portion of reduced thickness which extends at least partially around the cavity 14 and which provides a shoulder 19, the case and the plastic material therein being machined down to this shoulder during the manufacturing process, as will be discussed, the shoulder serving as a guide for the depth of the machining operation.

Mounted on the exterior of the bottom wall 12 of the case 11 are two electrical terminals or clips 22, Figs. 3 to 6, which are provided with eyelets 23 extending through the bottom wall of the case and anchored at their inner ends by a riveting operation, or the like. As will be discussed in more detail hereinafter, conductors leading from windings in the case may be inserted outwardly through the eyelets 23 and secured to the clips 22 by solder, or the like, to seal the case. The bottom of the recess 15 is provided with an aperture 25 therethrough for another electrical conductor to be described.

Figure 3:
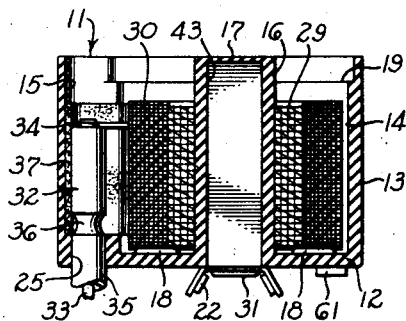
Fig. 3 is a view which is similar to Fig. 2, but which shows various electrical elements in the case and various conductors inserted thereinto and connected to the electrical elements.

Turning now to Fig. 3 of the drawings, primary and secondary windings 29 and 30 have been placed in the case 11. These windings are of annular configuration and the primary winding 29 encompasses the hollow core 16, the primary winding, in turn, being encompassed by the secondary winding 30. The windings 29 and 30 may be untreated, or may be treated in any suitable manner. For example, the windings may be varnished according to well known practice. Preferably, the windings are predried to eliminate moisture therefrom. It will be noted that, when the windings 29 and 30 are in place, they are spaced from the bottom wall 12 of the case 11 by the ribs 18 so as to permit the plastic material subsequently introduced into the case to flow under the windings.

The ends of the primary winding 29 are inserted through the eyelets 23 of the terminals or clips 22 to provide the necessary electrical connections to the primary winding, the ends of the primary winding being secured to the terminals 22 by soldering, or the like. One of the soldered connections is visible in Fig. 3 and is indicated by the numeral 31. Soldering, or otherwise securing, the ends of the primary winding 29 to the terminals 22 in this manner closes the eyelets 23 and thus seals the conductors leading to the primary winding 29, with respect to the case to prevent any leakage of the plastic material with which the case is subsequently filled.

One end of the secondary winding 30 may be grounded to one of the terminals 22 in a similar manner and the other end of the secondary winding is connected to a high tension cable 32. The cable 32 includes an electrical conductor or wire 33 which is connected to one end of the secondary winding 30 at 34. The conductor 33 is enclosed by insulation 35. The cable 32 is inserted into the case 11 through the aperture 25 at the lower end of the recess 15, the insulation 35 of the cable 32 making a tight fit with the periphery of the aperture 25 so as to provide a seal preventing leakage of the plastic material with which the case is subsequently filled, as will be described. Thus, no auxiliary seal is necessary for the high tension cable 32, which is an important feature.

The insulation 35 of the cable 32 is provided with an annular groove 36 therein within the recess 15. When the case 11 is filled with plastic material, it fills the groove 36 and, after setting, mechanically locks the high tension cable 32 in place in a positve manner, even if the exterior of the insulation 35 does not bond to the plastic filling.

The inner end of the cable 32 is disposed adjacent and parallel to that portion of the sidewall 13 of the case 11 which defines the recess 15. We prefer to insert a sheet 37 of fibrous material, such as heavy blotting paper, between the inner end of the cable and the adjacent wall, the material being deformed to a shape indicated in Fig. 7. The sheet 37 serves to space the cable 32 from the adjacent wall and, when the case 11 is filled with plastic material, the sheet 37 is impregnated with such plastic material to additionally insulate the cable 32 and substantially increase the puncture strength at high voltages.

Figure 4:
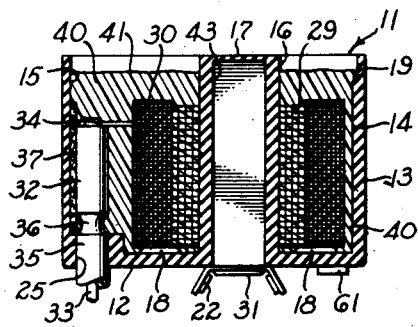
Fig. 4 is a view which is similar to Fig. 3, but which shows the case filled with plastic material.

Referring now to Fig. 4 of the drawings, after the windings 29 and 30 have been placed in the case 11 and after the foregoing electrical connections thereto have been made, the case 11 is filled with a plastic material 40, preferably in liquid form, to a level 41 above the windings 29 and 30 and the various connections thereto. If desired, the case 11 can be filled with the plastic material 40 to the upper rim of the case but this is not essential. Preferably, some excess plastic material is placed in the case over and above the ultimate level 41 since the plastic material will progressively impregnate the various elements in the case and since some air is often initially entrapped, a sufficient excess being employed to compensate for such entrapped air and to compensate for impregnation by the plastic material. The filling operation is readily performed, no funnel being necessary to guide the plastic material into the annular space around the core 16 as the material can be poured directly on the top wall 17 and which will spread it to the annular space. Ultimately, any and all spaces, crevices, and the like, are filled with the plastic material so that the entire structure is substantially integral after setting of the plastic material. In addition, the sheet 37 of fibrous material is impregnated with the plastic material 40, as hereinbefore discussed.

Any suitable plastic material 40 may be employed, preferably of the resin type such as epoxy resins, fluorinated hydrocarbon resins in the liquid state, polyester resin, various polyvinyl resins, and the like. Desirable characteristics for the plastic material 40 are high penetrability so that it will penetrate minute crevices, such as the spaces between the turns of the windings 29 and 30, high resistance to moisture, acids, alkalies, oils, and the like, low shrinkage, high dielectric constant, high puncture strength, good high frequency characteristics, and the ability to operate at high temperatures, e.g., up to 300° F. Additionally, it is desirable that the plastic material 40 used be bondable to some extent at least to the case 11 and other elements of the structure. As hereinbefore pointed out, if Bakelite is employed for the case 11 and an epoxy resin for the plastic filling, as is preferred, then an extremely strong bond with a mutual strengthening effect results, the final assembly having a greater resistance to mechanical shock and a greater resistance to abrasion than would be the case with either material by itself, which is an important feature. Also, the plastic material 40 is preferably transparent, or at least semitransparent, when set so that the windings 29 and 30 and their electrical connections may be inspected readily.

In the light of the foregoing desirable characteristics, epoxy resins are preferred. These can be mixed with a catalyst just before using, the catalyst causing polymerization.

For some applications, especially where high temperatures are not encountered in use, other plastic materials may be used. For example, in some instances, asphaltic compounds may be used, as in relays and coils which are not required to operate under high temperatures. Thus, it will be seen that the particular material to be used for the plastic material 40 depends on the use to which the resulting product is to be put, it being understood that we do not desire to be limited to any particular material.

In order to insure complete elimination of entrapped air from the interior of the case 11 and the elements therein, particularly the windings 29 and 30, we prefer to place the structure shown in Fig. 4 in a vacuum chamber and to subject it to a high vacuum, e.g., several millimeters of mercury absolute. Applying a vacuum in this manner results in the escape of entrapped air from the plastic material 40, the windings 29 and 30, and other elements, and also results in the evaporation of any residual moisture which may be contained in the plastic material itself, or which may be associated with other elements of the structure. By observing the structure of Fig. 4 while in the vacuum chamber, it will be found that the escape of air and/or moisture is indicated by the formation of bubbles at the surface 41 of the plastic material. The fact that all air and/or moisture has been eliminated is indicated by the cessation of bubbling.

An alternative way of eliminating air and of insuring complete penetration by the plastic material 40 is to place the structure of Fig. 4 in a centrifuge. Expulsion of air and penetration by the plastic material 40 may be attained in other ways also. In any event, after the air and/or moisture have been eliminated, the plastic material 40 has impregnated all of the impregnatable elements within the case and has filled all of the crevices in and/or between elements so that the plastic material is in intimate contact with all parts of all of the elements which are accessible to it, which is an important feature of the invention.

After the foregoing operations have been completed, the plastic material 40 is set, the setting of the plastic material requiring the application of heat in the event that the plastic material is thermosetting. If an epoxy resin is employed, as is preferable for the high-voltage coil under consideration, the structure of Fig. 4 is allowed to stand after air and moisture elimination for a period of, for example, 15 hours at atmospheric pressure and temperature. During this time, some polymerization takes place, the reaction being exothermic so that the temperature of the plastic material is raised during this interval. Thereafter, the structure is maintained at a temperature of, for example, 120° to 130° F. for a period of approximately one hour, during which polymerization is completed, the plastic material 40 then being hard and stable. However, in some instances, complete polymerization may occur at room temperatures. It will be understood that the foregoing example is intended as illustrative only, other numerical values and steps being required for other materials.

Figure 5:
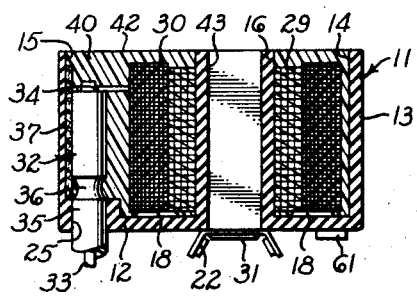
Fig. 5 is a view which is similar to Fig. 4, but which shows the product after the machining operation to remove the upper end of the case and the upper portion of the plastic filling.

Referring now to Fig. 5 of the drawings, after the plastic material 40 has set, the upper end of the case 11 and the upper portions of the plastic material 40 therein are machined off to a level below the final level 41 of the poured plastic material, but above the various elements encased in the plastic material, i.e., above the windings 29 and 30 and the electrical connections thereto. Thus, this machined surface, designated by the numeral 42 in Fig. 5, forms one wall of the resulting unit—a wall impenetrable by moisture. As hereinbefore pointed out, the term "machining" is used generically to cover various ways of producing the surface 42, such as cutting, grinding, etc.

An important feature of the machining of the upper end of the case 11 and the upper portions of the plastic material 40 to the level 42 is that this operation also removes the top wall 17 of the core 16 to provide an opening 43 entirely through the resulting structure, this opening being adapted to receive a core structure, or one leg of a core structure, as hereinafter discussed in detail. Another feature of machining off the case and the plastic material is that all porous surface portions of the plastic material 40 are removed by this operation, if any such porous portions exist. With some plastic materials, the air bubbling through the plastic material during the air elimination operation hereinbefore discussed is trapped by a tacky top surface formed by contact with the atmosphere. Such air bubbles entrapped just below the upper surface of the plastic material render the upper portions porous, and such porous portions are removed by the machining operation, which is an important feature.

Referring to Figs. 6 to 9 of the drawings, illustrated therein is an assembly which includes the structure of Fig. 5, hereinafter identified by the numeral 50, and various other elements. The structure 50 has been provided with leads 51 suitably connected to the terminals 22, these leads being provided at their outer ends with terminals 52. The high tension cable 32 has also been provided at its outer end with a terminal 53. A magneto core structure 55 has been assembled with the structure 50, the core structure having outer legs 56 and a central leg 57. The outer legs 56 receive the structure 50 therebetween and the central leg 57 is disposed in the opening 43 through the structure 50. The core structure 55 and the structure 50 are held in assembled relationship by two thin, metal clips 58 which extend through the opening 43 on opposite sides of the central leg 57. The clips 58 have lateral tabs 59 seated against the machined face 42 of the structure 50 at one end, the opposite ends of the clips 58 terminating in lateral tabs 60 seated on the core structure. Thus, the structure 50 and the core structure 55 are securely assembled.

The structure 50 and the core structure 55 are also secured together against relative movement under vibrational forces, or the like, by means of two pairs of ribs 61 on the exterior of the case 11. As best shown in Fig. 11 of the drawings, the ribs 61 of each pair converge inwardly so that the core structure 55 is, in effect, wedged between the ribs of each pair when it is anchored in place by the clips 58. With this construction, the core structure 55 and the structure 50 are securely keyed together so that no relative movement therebetween can occur, even under severe vibrational stresses, which is an important feature.

Referring to Fig. 10 of the drawings, illustrated therein is an alternative electrical connection between the high tension cable 32 and the secondary winding 30, this connection being an alternative for the simple connection 34 disclosed previously. An end 65 of the winding 30 is seated against the bottom of the recess 15, the recess being somewhat shallower in this case than previously. Embedded in the material of the case 11 is a connecting device 66 having a screw portion 67 onto which the high tension cable 32 is threaded, the threads of the screw portion 67 making intimate contact with the wire 33 in the high tension cable. The connecting device 66 has a noncircular head 68, which may be hexagonal, for example, disposed in a complementary recess in the material of the case 11, the head 68 in its recess preventing the connecting device from turning when the cable 32 is threaded onto the screw portion 67 thereof. The connecting device 66 has a stem 69 which extends through the material of the case 11 into the recess 15 and through the end 65 of the winding 30, a nut 70 being threaded on the stem 69 to clamp the end 65 of the winding 30 securely against the bottom of the recess 15. The end 65 of the winding 30, the nut 70 and the portion of the stem 69 which projects into the recess 15 are all completely encased by the plastic filling 40, as will be apparent. The cable 32 may be threaded onto the screw portion 67 readily by inserting it into the aperture 25 and rotating it, as will be apparent.

Turning to Fig. 12 of the drawing, illustrated therein is an alternative way of connecting a lead 71 to one of the windings, e.g., the winding 30, although it may be used for the winding 29 as well. Embedded in the plastic material 40 and connected to one end of the winding 30 is a metallic terminal or block 72, this terminal having been connected to the winding 30 prior to filling the case 11 with the plastic material 40 and having been held in position during the operation of filling the case with the plastic material by the end of the winding 30 connected thereto. After the plastic material 40 has set, a hole 73 is drilled through the plastic material 40 down to the terminal 72 and, subsequently, another hole 74, which may be smaller than the hole 73, is drilled into or through the terminal 72, care being taken to insure that the hole 73 is not carried in too close to the windings. Thereafter the hole 74 in the terminal 72 is tapped to receive a screw 75 which clamps the lead 71 against the machined face 42 of the plastic material 40. With this construction, the lead 71 is clamped tightly against the machined face 42 and the head of the screw 75 is in positive engagement with the lead 71, the threaded portion of the screw being in intimate contact with the terminal 72, whereby an excellent electrical connection is obtained.

The structure shown in Fig. 13 is similar to that shown in Fig. 12, the only difference being that the terminal 72 is seated against a shoulder or seat 76 on the case 11 so that it is only partially embedded in the plastic material 40. A somewhat longer screw 75 is required in the particular construction shown in Fig. 13 to reach the terminal 72. Identical reference numerals are employed for like elements in Fig. 13 and it is thought that a further description is unnecessary.

Figures 14, 15:
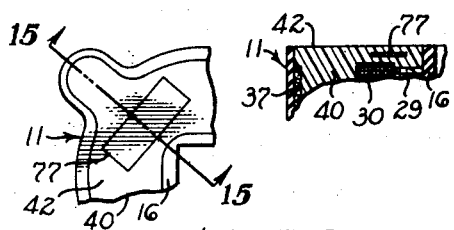
Fig. 14 is a fragmentary bottom plan view similar to a portion of Fig. 9 but showing a label embedded in the plastic filling.
Fig. 15 is a fragmentary sectional view taken along the arrowed line 15—15 of Fig. 14.

Referring now to Figs. 14 and 15, an important feature of the invention is that a descriptive label 77 may be embedded in the plastic material 40 in a position such that it is just under the machined surface 42 after the excess plastic material and the corresponding portion of the case 11 have been machined off. The label 77 is thus clearly visible and may bear various descriptive notations, such as the name of the manufacturer, the model number of the device, the rating of the device, etc. Preferably, the label 77 is made of a nonconducting material, paper, such as blotting paper, being an example.

Although we have disclosed exemplary embodiments of our invention herein, it will be understood that other embodiments may be devised and that various changes, modifications and substitutions may be incorporated in the embodiments disclosed, all without departing from the spirit of the invention.

We claim as our invention:

1. In a method of making a device having a case provided with a closed lower end and an open upper end and provided with a hollow core integrally upstanding from said lower end of said case and which is open through said lower end and closed at its upper end, said device including at least one electrical device in said case encircling said core and including electrical conductors extending into said case below the top thereof and connected to said electrical device, the steps of: filling said case with a plastic material to a selected depth more than sufficient to cover said electrical device, and subsequently machining off the upper end of said case and a portion of said plastic material therein, after setting of said plastic material, to a level above said electrical device but below said selected depth and below said closed upper end of said hollow core, whereby to provide a flat unobstructed upper surface and a core opening completely through said device.

2. In an electrical device, the combination of: a case provided with a cavity which is closed at its lower end and open at its upper end and provided with a recess at one side which communicates laterally with said cavity and which is open at its upper and lower ends; at least one electrical element in said cavity; electrical conductors extending into said case and connected to said element, one of said conductors extending into said recess through and closing said open lower end of said recess and being disposed adjacent and parallel to the wall of said recess; a sheet of porous fibrous material disposed between said one conductor and said adjacent wall of said recess; and a filling of plastic material in said recess and said cavity and covering said element, said sheet of fibrous material and those portions of said conductors which are within said case, said plastic material impregnating said fibrous material.

3. In an electrical device, the combination of: an integral case having inner and outer spaced walls defining an annular space therebetween and a bottom wall closing the bottom of said annular space, said inner wall defining a hollow core opening extending through said case; an electrical element in said annular space; and conductors extending into said case below the top thereof and connected to said device, a filling of hardened plastic material filling said annular space and completely enclosing said element, said case and said plastic material having continuous and unobstructed flush upper surfaces at a level above said element and said conductors.

4. A device as defined in claim 3 wherein said flush surfaces are machined to define a substantially flat planar surface.

5. A device as defined in claim 3 wherein the upper surface of said inner wall is formed by cutting away an integral closure, at the upper end of said core opening.

6. A device as defined in claim 3 wherein said plastic material is bonded to said case and impregnates said element.

7. A method of making an electrical device, including the steps of: making an integral case having a closed bottom and an open upper end and having a hollow upstanding core therein integral with said bottom of said case, open at its lower end through said bottom, and closed at its upper end; placing an electrical element in said case around said core; inserting at least one electrical conductor through a wall of said case below the top thereof and connecting it to said element; filling said case with a thermosetting plastic material to a selected depth more than sufficient to cover said element and those portions of said conductor which are disposed in said case; subsequently setting said plastic material; and thereafter machining off the upper end of said case, the closed upper end of said core, and a portion of said plastic material in said case to a level above said element and said portions of said conductor which are disposed in said case, but below said selected depth and the closed upper end of said hollow core, whereby to provide an opening completely through said device and a continuous and unobstructed upper surface thereon.

References Cited in the file of this patent

UNITED STATES PATENTS

| | | |
|---|---|---|
| 1,139,973 | Herz | May 18, 1915 |
| 1,235,744 | Washburn | Aug. 7, 1917 |
| 1,545,429 | Hunt | July 7, 1925 |
| 1,558,043 | Priess | Oct. 20, 1925 |
| 2,028,375 | Andre | Jan. 21, 1936 |
| 2,136,609 | Butterfield et al. | Nov. 15, 1938 |
| 2,138,606 | Lanphier | Nov. 29, 1938 |
| 2,168,757 | Baillard | Aug. 8, 1939 |
| 2,318,755 | Channell | May 11, 1943 |
| 2,354,931 | Tolman | Aug. 1, 1944 |
| 2,391,038 | Rifenbergh | Dec. 18, 1945 |
| 2,400,647 | Kohring | May 21, 1946 |
| 2,418,531 | Tognola | Apr. 8, 1947 |
| 2,511,436 | Kauth | June 13, 1950 |
| 2,549,770 | Burnham | Apr. 24, 1951 |
| 2,556,825 | Smith | June 12, 1951 |
| 2,577,602 | Burton | Dec. 4, 1951 |
| 2,590,821 | Kiser | Mar. 25, 1952 |
| 2,633,605 | Brucker | Apr. 7, 1953 |
| 2,695,856 | Firth | Nov. 30, 1954 |

FOREIGN PATENTS

| | | |
|---|---|---|
| 153,591 | Switzerland | June 16, 1932 |
| 943,847 | France | Mar. 18, 1949 |

OTHER REFERENCES

Publication I—"Plastic Embedded Circuits," by W. R. Cuming, in "Electronics" magazine, June 1950, pages 66–69.

Publication II—"Ethoxylines," by Preiswerks and Charlton, in "Modern Plastics" magazine, November 1950, pages 85–88.